United States Patent [19]

Billing

[11] Patent Number: 5,153,726
[45] Date of Patent: Oct. 6, 1992

[54] RECORDING AND EDITING OF MOVING TELEVISION PICTURES

[75] Inventor: Robert Billing, Crowthorne, Great Britain

[73] Assignee: Questech Limited, Wokingham, United Kingdom

[21] Appl. No.: 377,833

[22] PCT Filed: Dec. 30, 1987

[86] PCT No.: PCT/GB87/00923
§ 371 Date: Aug. 18, 1989
§ 102(e) Date: Aug. 18, 1989

[87] PCT Pub. No.: WO88/05245
PCT Pub. Date: Jul. 14, 1988

[30] Foreign Application Priority Data

Dec. 30, 1986 [GB] United Kingdom ............ 8631027
Jun. 3, 1987 [GB] United Kingdom ............ 8713018

[51] Int. Cl.⁵ .................................................. H04N 5/14
[52] U.S. Cl. ............................................................ 358/160
[58] Field of Search .............. 358/160, 22; 365/189, 365/238, 230, 225

[56] References Cited

U.S. PATENT DOCUMENTS

| | | | |
|---|---|---|---|
| 4,437,121 | 3/1984 | Taylor et al. | 358/160 |
| 4,450,538 | 5/1984 | Shirasaka | 365/189 |
| 4,485,402 | 11/1984 | Searby | 358/160 |
| 5,023,718 | 6/1991 | Soloff | 358/160 |

FOREIGN PATENT DOCUMENTS

| | | |
|---|---|---|
| 0097778 | 1/1984 | European Pat. Off. |
| 0156316 | 10/1985 | European Pat. Off. |
| 0189576 | 8/1986 | European Pat. Off. |

OTHER PUBLICATIONS

1986 IEEE International Solid-State Circuits Conference, Digest of Technical Data Papers, Feb. 21, 1986. IEEE, Ohta et al.: "A 1 Mb DRAM with 33 MHz Serial I/O Ports", pp. 274-275.

Primary Examiner—James J. Groody
Assistant Examiner—David E. Harvey
Attorney, Agent, or Firm—Fleit, Jacobson, Cohn, Price, Holman & Stern

[57] ABSTRACT

A system enabling a digital video signal to be recorded and reproduced utilizing a solid state memory store (1) as the recording medium comprises a plurality of random access memory sub-systems (1A-1D) each incorporating a read/write buffer (2). The buffers (2) are connected in parallel to a common video data bus (3) and addressing and control inputs of the subsystems (1A-1D) are connected in parallel to a common control bus (5). One or more read/write sub-systems (6) are arranged to receive and/or output digital video signals in real time via an input (10) or output (11), such signals being transferred to and/or from the store (1) via a corresponding buffer (7; 9) coupled to the data bus (3). The capacity of the buffers (2, 7, 9) and the data bus (3) is a multiple of that of the input (10) or output (11) so that each read/write system (6) can transfer accumulated data at a slower rate than it is received or output. The transfer of data via the read/write sub-system (6) is effected by addressing memory sub-systems (1A-1D) consecutively with the same address whereby consecutive groups of data bits of a serial signal are distributed between respective memory sub-systems (1A-1D). Thus recording and replaying of a digital video signal can be effected in real time using solid state memory devices that are relatively slow to operate.

6 Claims, 1 Drawing Sheet

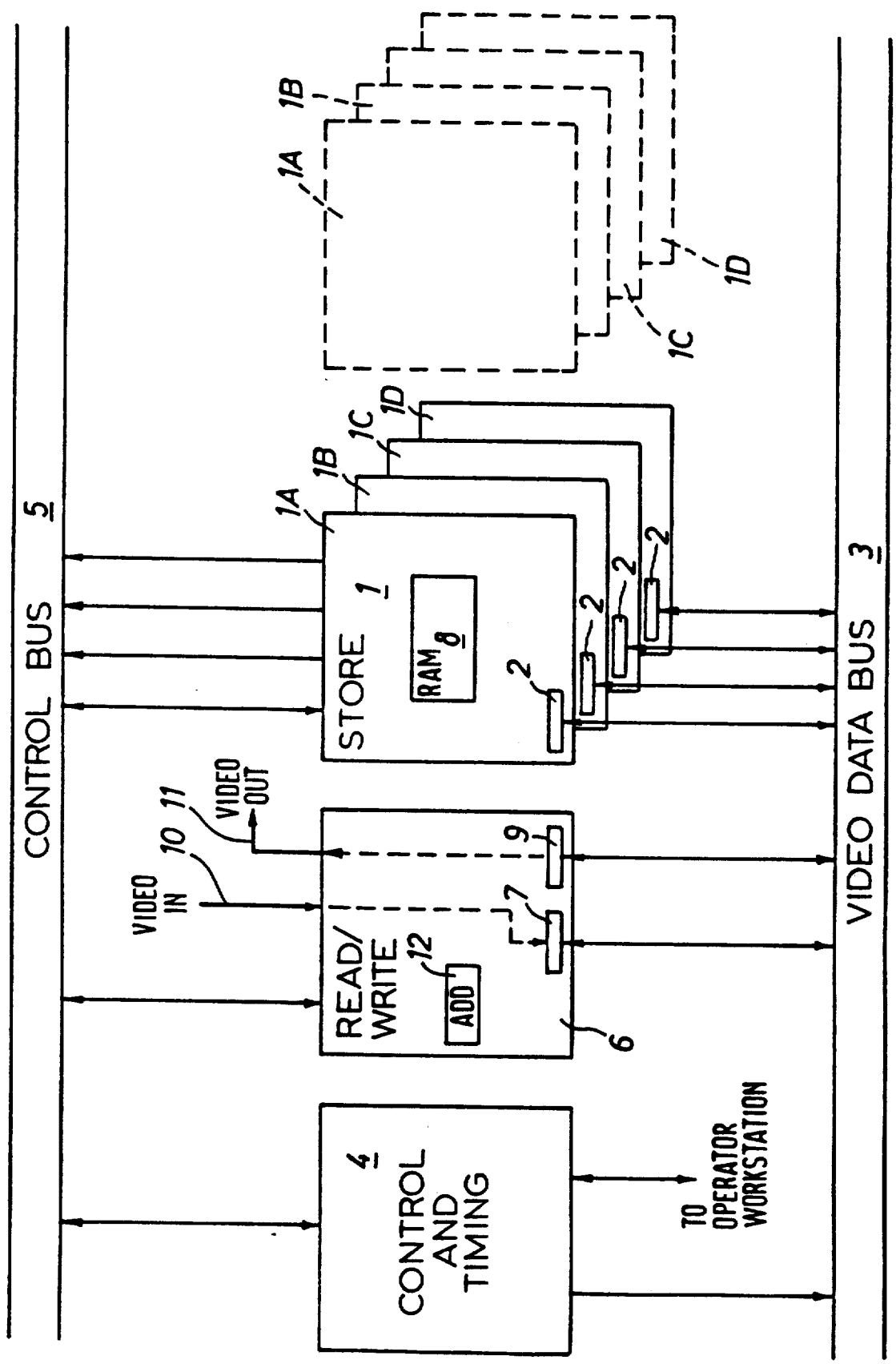

RECORDING AND EDITING OF MOVING TELEVISION PICTURES

BACKGROUND OF THE INVENTION

This invention concerns the storage and editing of moving television pictures, and more especially to the storage of television pictures in digital form in solid state random access memory chips, to enable digital television pictures to be retrieved from the store for editing.

Although systems exist that enable the storage of individual television frames in memory stores to enable the modification of the television images for the production of so-called digital video effects, the capacity of available stores is such that only a very limited number of individual image frames can be stored at a given time.

Therefore, where it is desired to record and edit moving television pictures, the current state of the art requires that such moving pictures be recorded on magnetic or optical tapes or discs and subsequently replayed to enable editing to be carried out. Such systems, however, all suffer from the drawback that mechanical movement of the recording medium is required, that a significant amount of time is taken in moving the medium or access mechanism when it is desired to replay a different portion of the recording and that only one point on the recording can be replayed at any one time.

SUMMARY OF THE INVENTION

In accordance with the present invention it is proposed to utilise the ever larger random access memory devices that are now becoming available to store significantly larger numbers of frames of picture image information, with the object of providing an all-electronic moving picture recorder which is capable of recording, replaying and editing several minutes of moving television pictures without the use of mechanical moving parts. Such a system may store the picture information entirely in random access memory chips and be capable of reading and writing in several places at once in the store so that it can be used as a replacement for several video tape or disc recorders at once.

The system to be described below uses devices organised as 1 Megabit × 1 dynamic, however, it is possible to use other devices such as static or semi-static devices and other device sizes.

Before it is stored the picture information must first be sampled or broken up into discrete elements known as pixels. In the system to be described this is done according to the standard known as the 4:2:2 standard or the CCIR 601 standard, however this is not necessary and the invention could be realised by means of a variety of different sampling systems.

In accordance with one aspect of the invention a memory store for receiving digital television picture signals to be transmitted thereto in serial form comprises a plurality of memory storage sub-systems each incorporating a corresponding input/output buffer, the said sub-systems being connected in parallel to data and control signal buses and control means being provided for presenting to said control buses addressing and read and/or write signals for the storage and/retrieval of said serial picture signal, the arrangement being such that adjacent groups of data bits of said serial signal are distributed between the respective sub-systems whereby each bit of each group is assigned to a corresponding memory address in a respective one of said sub-systems.

Thus, by applying to all of said sub-systems common addressing signals identifying the respective groups of data bits, together with read or write signals that cause the buffers of the respective sub-systems to respond in sequence at the repetition rate of the data-bits, a serial data signal can be stored in the sub-systems in real time, whilst the time required for storage of each data bit in a corresponding memory sub-system is increased in relation to the repetition rate of the data bits by a factor corresponding to the number of sub-systems.

BRIEF DESCRIPTION OF THE DRAWINGS

A system in accordance with the invention is illustrated by way of example in the accompanying drawing, the single figure of which is a block diagram showing the organisation of a solid state memory enabling the reading and writing of a data signal in serial form.

DESCRIPTION OF THE PREFERRED EMBODIMENTS

Referring to the drawing the memory system comprises a plurality of memory sub-systems 1, each one of which typically contains 512 individual random access memory chips, indicated diagrammatically at 8, each of one Magabit × 1 organisation. The sub-systems are then arranged in groups, typically of four sub-systems, as indicated by the four systems 1A, 1B, 1C and 1D. Each sub-system includes an input/output buffer 2 by means of which data may be written to and read from the memory devices of the sub-system. Each buffer 2 of a sub-system is connected in parallel to a video data bus 3.

The overall control of the access to the memory sub-systems 1A to 1D is achieved by means of a further sub-system 4, typically containing a microprocessor, which provides all the main timing control signals to the memory sub-systems 1 via a control bus 5 to which all sub-systems are connected in such a manner that each sub-system 1 can be addressed uniquely by the sub-system. The latter is also capable of writing test data into the store and reading it out, via the data bus 3. The facility is used to determine the presence and location of defective areas within the store, and the same facility can be used to allow test cards to be written into the store and presented on the outputs from the system.

Although for the sake of clarity, the data bus 3 and control bus 5 have been indicated in the drawings as single lines, it will be appreciated that each line may represent a number of separate conductors. Thus, in the system organised as described above, the line 3 represents sixty four separate data conductors all connected in parallel to the buffers 2 of the respective sub-systems 1A, 1B, 1C and 1D, so that sixty four bits can be written to or read from each of the sub-systems in one operation. The memory devices 8 contained in the respective sub-systems are significantly slower in operation than the associated buffer devices 2 and the corresponding rate at which electrical signals can be provided to the buffers via the conductors interconnecting the sub-systems, and hence the number of electrical conductors connecting the sub-systems can be reduced by multiplexing. Thus, a signal containing data relating to consecutive picture points of a video signal obtained by sampling picture information as described above is divided amoung the sub-systems in such a manner that each sub-system receives a corresponding component of the multiplexed signal containing information relating to a group of consecutive picture points presented simultaneously on the data bus 3.

The operation of writing the data bits of a digital television signal into the store provided by the sub-systems 1 and/or reading the data from the store, is effected by means of a sub-system 6, of which more than one may be provided as described below, which sub-system is coupled to the video data bus 3 in parallel with the memory sub-systems 1, and which is likewise controlled from the control and timing sub-system 4 by way of the control bus 5 by means of which it is capable of being addressed uniquely. The read and/or write subsystem 6 comprises an output buffer 7 and/or an input buffer 9 coupled to the video data bus 3, an input 10 for a digital video signal and/or an output 11. The sub-system 6 further includes an address generator 12 for determining the address within each memory store sub-system at which data presented to the data bus is to be written or read.

The operation of the system described above is as follows. Assuming that an incoming video signal presented at the input 10 is to be written into the store 1, the input signal, which typically comprises a series of consecutive 8 bit data words the bits of which are presented upon corresponding conductors of the input 10, is accumulated as a group of data bits corresponding to the number of available conductors provided by the data bus 3, and loaded into the buffer 7. The initial address within the store 1 at which the incoming signal is to be stored is determined by the sub-system 4, for example under operator control from the work station coupled thereto, and this address is transmitted to the address generator 12 of the sub-system 6 via the control bus 5. Each group of sixty four bits presented to the buffer 7 is then read into a corresponding one of the storage sub-systems 1A to 1C, in a data transmission cycle wherein the sub-system 6 presents the group of data bits on the video data bus 3, whilst presenting on the control bus 5 the address contained within the address generator 12 and a read-signal addressing uniquely that one of the sub-systems 1A to 1C which is to receive the sixty four bit data signal. The latter signal is accordingly read into the buffer 2 of the relevant sub-system, e.g. system 1A. This cycle is completed four times for each address provided by address generator 12, whereby four consecutive sixty four bit data signals are stored at the same address, one in each of the memory storage sub-systems 1A to 1C. The address generator 12 then advances to the next address at which the next four sixty four bit data signals corresponding to 32 consecutive data words presented at input 10 are to be stored. It will be noted that once the initial address has been presented to the address generator 12 by the control sub-system 4 the address generator will continue to generate addresses sequentially in order to store, in real time, a digital video signal presented at input 10.

The operation of reproducing a video signal from the store 1 is effected in a similar manner by the application of an initial command signal and address location to the sub-system 6, whereupon the latter will continue to present command signals and corresponding addresses to the storage sub-systems 1A to 1C via the control bus 5.

In the typical example described, the distribution of each video signal between the group of four storage devices enables data transfer to be effected between the buffers 7 and/or 9 of the or each sub-system 6 on the one hand, and the buffers 2 of the memory storage subsystems 1A to 1C on the other hand, at a significantly greater speed than the limit imposed by the time required for transfer of data from the buffers 2 to the random access memory devices 8. It is thus possible to make use of low cost memory devices which are much slower than the data rate of a digital television picture signal transmitted in real time.

In the arrangement illustrated, the rate at which data can be transmitted between the buffers of the subsystems 1 and 6 is approximately one half the data rate of a digital television signal to be received at the input 10 or transmitted from the input 11, and thus the fact that eight consecutive data words received from the input 10 or to be transmitted to the output 11 can be handled by the data bus 3 in a single cycle will enable the transmission of data to or from up to four sub-systems 6 simultaneously, by multiplexing.

Accordingly, a system in accordance with the invention may thus provide for the simultaneous recording or reproduction of up to four separate digital video images utilising a common store 1. By combining the corresponding digital video signals from the respective subsystems 6 utilising a mixing arrangement, a variety of editing functions can be carried out via the control and timing sub-system 4.

For example, if the control system is implemented using a microprocessor it is possible to write a program to run on that processor which can record a number of separate sequences of pictures, known as shots, and play them back in any desired order. This is achieved by programming the microprocessor to maintain a list of the locations within the store at which the individual frames of the shot are held and then read all or part of several lists in any desired order. This allows an operator with a suitable computer terminal connected to the microprocessor to instruct the system to compose a program out of all or part of a number of shots. These instructions can be changed very quickly and so it is possible for the operator to revise the program in less than the running time of the program.

Alternatively, in an arrangement where a more complicated operation is involved in the editing of a stored image frame, or sequence of image frames, for example the manipulation of images to produce a complex change in the shape, size or orientation of the image, the processing of individual image frames can be effected in non-real time between the operations of recording and replaying the television picture signals. Thus stored image frames may be retrieved from a store sub-system and transferred to a framestore that is capable of being interrogated over a period of time longer than the original frame period by a computer programmed with an appropriate algorithm, in order, with the aid of an interpolator or a computer programmed with an algorithm capable of simulating an interpolator, to perform the required image transformation. The pixels of the transformed image derived from the interpolator are written into a further framestore at addresses determined by the computer algorithm and the transformed image frame can then be transferred from the second framestore to an appropriate store sub-system. The framestores may of course be omitted if the control system is such as to allow the store sub-systems to be interrogated or addressed in non-real time with the locations of individual pixels of an image frame.

I claim:

1. A memory storage device for the storage of digital television picture signals, comprising:

a common data signal bus;

at least one write sub-system having an input for receiving a digital television picture signal of the kind wherein data relating to consecutive pixels of the picture image is presented serially, an output buffer having connected in parallel to said data signal bus a predetermined number of signal paths that correspond to a predetermined multiple of the number of data bits required to define each pixel of the picture signal, and means for sampling an input picture signal to present consecutively to said output buffer groups of data bits from said input signal, each of said group corresponding to said predetermined multiple of consecutive pixels of said picture image;

a plurality of memory storage sub-systems each incorporating an input buffer having a number of signal paths equal to said predetermined number, connected to said common data signal bus in parallel with one another and with said output buffer of said write sub-system; and control means connected to said write sub-system and to said plurality of memory storage sub-systems by means of a control bus, said control bus being coupled in parallel to said memory storage sub-systems for the provision of memory addressing signals and being coupled to said write sub-system and to said memory storage sub-systems for the provision of write and read signals which address uniquely said write sub-system and each memory storage sub-system, said control means being so adapted to provide said write and read signals in timed relation that, with a common memory address presented on said control bus, write signals provided to said write sub-system and read signals presented respectively to each of said plurality of memory storage sub-systems cause consecutive groups of said data bits of said input signal to be stored at the same memory address in respective ones of said memory storage sub-systems.

2. A device as claimed in claim 1, wherein said memory storage sub-systems further include output buffers coupled in parallel to said common data signal bus, said memory storage device comprising at least one read sub-system having an input buffer coupled to said data signal bus in parallel with the output buffers of said memory storage sub-systems, said read sub-system being adapted to sample data signals input consecutively at its input buffer and to provide, at a video signal output thereof, a digital video signal comprising, in serial form, data corresponding to consecutive pixels of a picture image, and said control means is adapted to provide read signals to said read sub-system and write and memory address signals to said memory storage sub-systems for retrieval of data stored by a write sub-system.

3. A device as claimed in claim 2, wherein said memory storage sub-systems are arranged in a plurality of groups each of a predetermined number of sub-systems, and said control means is arranged to store or retrieve a given signal in a corresponding group of sub-systems by distributing read or write signals between the respective sub-systems of a given group.

4. A device as claimed in claim 1, wherein said control means comprises a control sub-system coupled to an operator station and a plurality of read and/or write sub-systems, said control sub-system, said read and/or write sub-systems and said memory storage sub-systems all being connected in parallel to said common control bus, and the arrangement being such that said control sub-system can, under operator control, transmit control signals to all other sub-systems, and said read and/or write sub-systems can, under control by said control sub-system, each transmit control signals to said memory storage sub-systems.

5. A device as claimed in claim 4, wherein each read and/or write sub-system incorporates an address generator for identifying the address in each memory storage sub-system at which data is to be stored and/or retrieved, and the arrangement is such that at the commencement of storage or retrieval of a given signal the said address generator is set to a starting address by said control sub-system whereupon the address generator is advanced sequentially under control by the respective read and/or write sub-system following each step of addressing the memory storage sub-systems of a given group.

6. A device as claimed in claim 4, wherein the arrangement is such that data transfer between each read and/or write system and a corresponding group of memory storage sub-systems is effected in multiplex in a plurality of consecutive cycles corresponding to the number of sub-systems in the group, and the activation of each of a plurality of read and/or write sub-systems by said control sub-system is likewise effected in multiples in a plurality of consecutive cycles corresponding to the number of such sub-systems of the device activated, the respective multiplex cycles being interleaved with one another such that between consecutive cycles of each read and/or write sub-system all other read and/or write systems activated at a given time complete one data transfer cycle.

* * * * *